United States Patent [19]
Loveland

[11] Patent Number: 6,037,945
[45] Date of Patent: Mar. 14, 2000

[54] GRAPHICAL METHOD FOR MODELING AND ESTIMATING CONSTRUCTION COSTS

[75] Inventor: James B. Loveland, Orem, Utah

[73] Assignee: Xactware, Inc., Orem, Utah

[21] Appl. No.: 08/991,148

[22] Filed: Dec. 16, 1997

[51] Int. Cl.[7] ........................... G06T 17/20; G06F 17/60
[52] U.S. Cl. .......................................... 345/420; 700/107
[58] Field of Search ............................. 364/468.14, 512; 345/420

[56] References Cited

U.S. PATENT DOCUMENTS

| | | | |
|---|---|---|---|
| 4,700,317 | 10/1987 | Watanabe et al. | 706/45 |
| 4,700,318 | 10/1987 | Ockman | 700/97 |
| 4,757,461 | 7/1988 | Stohr et al. | 345/420 |
| 4,970,666 | 11/1990 | Welsh et al. | 345/423 |
| 5,189,606 | 2/1993 | Burns et al. | 705/110 |
| 5,307,451 | 4/1994 | Clark | 345/427 |
| 5,448,696 | 9/1995 | Shimada et al. | 345/357 |
| 5,546,564 | 8/1996 | Horie | 700/83 |
| 5,668,736 | 9/1997 | Douglas et al. | 395/500.01 |
| 5,721,691 | 2/1998 | Wuller et al. | 395/500.01 |
| 5,742,291 | 4/1998 | Palm | 345/420 |
| 5,760,786 | 6/1998 | Marks et al. | 345/441 |
| 5,893,082 | 4/1999 | McCormick | 705/400 |

OTHER PUBLICATIONS

Laxton, W.R. et al., "Automatic Design of Structural Steelwork", Computer Aided Design, v. 12, No. 1, pp. 35–42, Jan. 1980.

Nagamitsu, S et al., "Cost Estimation System Connected with CAD/CAE/CG and VR for House Remodeling", National Technical Report (Japan), v.41, n.5, pp. 76–82, Oct. 1995.

Anonymous, "What's New", CADalyst, (ISSN 08205450), p. 24 (reprinted as pp. 1'–7'), Mar. 1995.

Kessler, Andrew J., "Virtual News", Forbes, v.155, n. 12, p. 164, Jun. 1995.

Ashford, J., "Built in a Day (use of Macintosh software to create composite photo visualising (sic.) new building)", MacUser, v. 10, N. 1, pp. 152–154, Jan. 1994.

Kallmann, Marceleo E., "Metamorphosis of Polyhedral Models Using Vector Fields in triangulations", Journal of Brazilian Computer Society special issue Comp. Graphics and Image Processing, pp.52–63, Apr. 1997.

Kallmann, Marceleo E. "Polyhedral Morphing", web page downloaded from www.lcg.ufrj.br~kallmann, on Feb. 1998.

*Primary Examiner*—Mark R. Powell
*Assistant Examiner*—Jeffrey Allen Rossi
*Attorney, Agent, or Firm*—Kirton & McConkie; Michael F. Krieger

[57] ABSTRACT

A method and system for modeling rooms or chambers in a structure for intuitive and accurate estimation of process parameters (e.g., material and labor costs for performing the process) associated with the rooms. A graphical user interface to an estimation program enables an estimator to insert a model of a room and thereafter morph and mold the model to approximate the room undergoing estimation. The model is represented as a polyhedron having a plurality of planes that may be assigned attributes such as floors, walls and ceilings. During the morphing process, the modified and other affected planes of the polyhedron are continually revised to maintain the integrity of the closed volume represented by the polyhedron. Upon completion of the morphing process of the model, the model may be queried by the estimator for performing estimations of target processes with the assigned attributes of the various planes intelligently returning areas and other parameters associated with the estimation polyhedron employed as an approximation of the room or chamber undergoing estimation.

20 Claims, 6 Drawing Sheets

```
POLYHEDRON NAME: ROOM 1

- POLYGON 1
        VERTICES:    A, B, C, D
        ATTRIBUTES:  SURFACE POLYGON, FLOOR
    - POLYGON 2
        VERTICES:    A, B, E, F
        ATTRIBUTES:  WALL , THICKNESS
    - POLYGON 3
        VERTICES:    B, C, F, G
        ATTRIBUTES:  MISSING WALL
    - POLYGON 4
        VERTICES:    C, D, G, H
        ATTRIBUTES:  WALL
    - POLYGON 5
        VERTICES:    A, D, E, H
        ATTRIBUTES:  WALL
    - POLYGON 5
        VERTICES:    E, F, G, H
        ATTRIBUTES:  CEILING

- LEVEL:      1ST FLOOR
    - STRUCTURE:  JONES' HOME
```

GRAPHICAL METHOD FOR MODELING AND ESTIMATING CONSTRUCTION COSTS

BACKGROUND OF THE INVENTION

1. The Field of the Invention

This invention relates to construction estimation using a computer or similar processing device for graphically depicting the topology of the target structure. More particularly, this invention relates to modeling and estimating construction attributes such as requisite material and labor using a graphical human interface for entering and modeling the target structure floor plan and related parameters.

2. Present State of the Art

The art of estimation has been performed for generations using basic accounting techniques. For example, estimation for construction related transactions such as building and remodeling have traditionally been performed through a manual process of partitioning such tasks into a series of entities such as rooms and then generating a comprehensive list of requirements for each of the rooms. For example, in estimating the remodeling of a kitchen, an estimator performs lineal measurements to determine the quantity of items such as cabinets, sheetrock, studding, paint, etc. Generation of such a list requires the estimator to physically perform liner measurements on each of the wall segments and further perform multiplicative operations to determine the square footage associated therewith.

While such a list-mode operation for estimating is reasonably simplistic for rectangularly shaped cubical rooms, when rooms or chambers exhibit more complex dimensions such as those associated with room offsets, bay windows, and missing wall segments, manual estimation becomes increasingly more complex and subject to error resulting in either an inefficient allocation of resources or an imprecise estimation of the proposed task. Furthermore, computerized list-mode type estimating products present a cumbersome interface through which a user must define the target room or chamber undergoing estimation using cryptic and non-intuitive definitions. That is to say, in such automated programs, the estimator must individually denote and add each entry, specifying each wall segment and relationships or angles between adjacent wall segments. Such a wall-element-by-wall-element listing presents frequent opportunity for user error and, for complicated geometries such as those having missing wall segments or other custom features, requires an estimator to utilize more sophisticated and cumbersome definitional rules to result in an acceptably accurate estimation of the target room or chamber. Such sophisticated dialogue with list-mode type estimation programs present a non-trivial and non-intuitive learning curve for estimators.

Graphical-mode type estimation presents a more intuitive format through which an estimator defines or describes a target room or chamber undergoing estimation. Graphical entry type estimators heretofore have employed a line-centric approach for defining a target room undergoing estimation. For example, an estimator defines a line segment designating a specific wall followed by a subsequent line segment associated with the prior line segment forming yet a second wall and continues such a process until a series of defined line segments represent the target room undergoing estimation. Problems arise in such a line-centric approach in determining when a particular room undergoing estimation comes into "existence." That is to say, when does a series of line segments form a closure giving rise to an entity for estimation. Additional uncertainties arise when a particular room or chamber undergoing estimation is comprised of missing line segments such as in the case of a first room "opening" into yet a second room. Furthermore, additional complications arise in associating other attributes to the aforedefined series of line segments. For example, associating a vertical height dimension of the wall with the line segments representing a linear horizontal dimension of the wall requires an estimator to perform additional definitional steps linking such attributes together.

FIG. 1 depicts a prior art sketch of a line-centric approach for defining a remodel area 10. As depicted in FIG. 1, remodel area 10 is comprised of a first room 12 and a second room 28. Room 12 is comprised of a series of line segments, line segments 14–26, forming first room 12 and line segments 30–38 forming second room 28.

Prior implementations of graphical interface programs for estimating chambers, such as rooms of structures, frequently employed shading (cross-hatching as shown in FIG. 1) or other designating techniques for partitioning a group of interconnected line segments into separable chambers or rooms. Such a process requires additional steps by the estimator in first selecting the parameter of a closed body and thereafter further partitioning the closed body using shading or other techniques for designating a yet smaller portion of the overall enclosed body.

It should further be pointed out that prior art implementations of graphical estimators heretofore have only operated on a two-dimensional rendition of a target chamber or room undergoing estimation. That is to say the line-centric graphical 18 approach depicted in FIG. 1 only depicts attributes consistent with the present two-dimension view generated by the estimator. This approach does not include other attributes such as those consistent with the vertical walls associated with the line segments or a ceiling associated with the room undergoing estimation when the perceivable view, as depicted in FIG. 1, represents the floor plan of the closed body undergoing estimation.

Therefore, significant problems exist in utilizing a non-graphical or list-mode program for estimating specific parameters of a chamber or room due to the non-intuitive nature of assembling the definition of a specific chamber or room, and furthermore, such shortcomings are exacerbated when the chamber or room undergoing estimation assumes non-cubical features or incorporates absent features such as missing wall segments as is characteristic of a first room opening into a second room. Additionally, graphical estimating programs heretofore have used a line-centric approach of concatenating a series of line segments eventually closing to form a closed two-dimensional body forming a single "entity" from which an estimation may be made. Additionally, graphical line-centric estimation programs have required additional steps by the estimator or user to specify and define portions of the closed body as a separate calculable entity and have not facilitated the assumption of attributes nor have they provided an estimator with a three-dimensional definition of the room or chamber undergoing estimation.

For these and other reasons, it appears that there exists no present modeling or estimation technique providing both a graphical and intuitive interface for an estimator to define a chamber or room undergoing estimation and derive attributes of the entire room, floors, ceilings and walls both existing and missing, directly from the definitional rendering of the target chamber or room. Furthermore, there does not currently exist a modeling technique for defining a room or chamber as a three-dimensional entity having attributes assigned to each of the facets of the room thereby facilitating the estimation of requisite components such as material and labor associated with each of the facets of the room or chamber.

OBJECTS AND BRIEF SUMMARY OF THE INVENTION

It is an object of the present invention to provide a method for modeling a chamber to enable estimation of chamber attributes for each of the facets or planes associated with the chamber undergoing estimation.

It is another object of the present invention to provide a method for hierarchically associating a first chamber having attributes for each of the facets or planes associated therewith, with a second chamber also having a plurality of facets or planes associated therewith.

It is yet another object of the present invention to provide a method for graphically estimating attributes of a room through a user interface capable of intuitively sizing a graphical representation or model of the room or chamber undergoing estimation to provide a graphical approximation of the chamber or room undergoing estimation and associating attributes with the facets or planes of the model.

It is a further object of the present invention to provide a graphical method for estimating construction related material and labor requirements for a room within a structure thereby enabling an estimator to intuitively depict the room undergoing estimation and derive attributes associated with the plurality of facets or planes associated with the room undergoing estimation and generate the requirements associated with the room undergoing estimation.

It is still a further object of the present invention to provide a computer-readable medium capable of performing the aforementioned objects of the invention of modeling and facilitating the estimation of a chamber or room having attributes assigned to each facet or plane comprising the chamber or room undergoing estimation and therefrom derive estimation requirements for the modeled chamber or room.

The present invention embodies within its scope both methods and systems for modeling a chamber or room, such as a room in a structure, wherein the chamber is comprised of a plurality of facets or planes forming facets such as a floor, walls and a ceiling. The present invention further embodies within its scope both a method and system for estimating, from the modeled chamber or room, requirements such as building materials and associated labor for use in bidding or acquiring materials associated with the construction or remodeling of a structure embodying the modeled room or chamber.

In the present invention, a chamber or room is graphically modeled by an estimator utilizing an estimation program having a graphical interface. Estimators intuitively sketch or create an estimate for a structure by partitioning a structure into entities (e.g., rooms or chambers) and associating estimates relating to those entities thereto. Estimators intuitively perceive the room as a three-dimensional entity but have heretofor been required to perform multiple steps to actually acquire useful information from graphical sketches. In the present invention, an estimator selects a default entity from a graphical tool kit in the estimation program of the present invention and places the entity (e.g., default room element) onto a grid for massaging and modifying until the entity assumes a sufficient approximation of the structure entity (e.g., room) undergoing estimation.

The default entity utilized by the estimator for stretching and contorting into the desired room-representative state is inherently defined by the estimation program to be a volumetric entity having spatial definitions and attributes in all three dimensions, consistent with the actual estimation characteristics of structures. In the present invention, the default entity is a polyhedron which, by definition, is a series of planes forming a closed volume. Some of the more simplistic polyhedrons are cubes and pyramids comprised respectively of six and four or five planes, while more complex polyhedrons may be comprised of dozens of planes or facets. In the present invention, an estimation polyhedron is modified or morphed by an estimator until it adequately models the room or chamber undergoing estimation. The morphing process that the estimation polyhedron is subjected to, continuously revises and maintains the integrity of the volumetric entity or polyhedron. That is to say, any planes or polygons affected by the stretching or introduction of additional planes into the estimation polyhedron, triggers a recalculation of the attributes (e.g., surface area; and vertices) of the affected and new planes of the estimation polyhedron.

The present invention further enables an estimator to assign descriptive attributes to various planes of the estimation polyhedron that introduce additional checks and verifications by the estimation program. For example, in estimations of residential inhabitable structures, a floor or surface plane is common upon which individuals may stand. By assigning to a plane of the estimation polyhedron the attribute of "floor," estimation requests by the estimator for the requisite amount of flooring required for the entity undergoing estimation yields the area of the plane or polygon assigned the attributes of "floor." Likewise, a query for an estimate by the estimator of the amount of conventional wallboard required to finish a room defined using the model of the present invention, would yield the surface areas of the planes or polygons of the polyhedron having the assigned attributes of "walls" and "ceiling."

Additional attributes stored by the polyhedron may include an updated area calculation for each of the polygons forming the planes that define the estimation polyhedron, and may further include an accurate calculation of the volume encompassed by the estimation polyhedron. Additional attributes may also include defining shared polygons between adjacent estimation polyhedrons to assume the attribute of a hidden wall thereby precluding the inclusion of the missing wall segment in the calculations of estimates for material and labor associated therewith.

Once the estimator has sufficiently modified the estimation polyhedron to be adequately representative of the room undergoing estimation, estimation queries may be posed to the room model. For example, the estimator may request an estimate for painting the room or chamber. The query is placed to the model and the model extracts from the attributes of the model those planes requiring paint (e.g., walls and ceilings but rot floors) and the square footage associated therewith. The query may simply return the number of square feet requiring the requested process or more sophisticated query requests may consult a material and services list to determine a cost of labor for the corresponding amount of square footage and additionally, the amount and price of paint required to perform the process. Likewise, estimation of other materials and services may be queried such as required flooring amounts and labor as well as heating and cooling requirements for the volume enclosed by the estimation polyhedron.

These and other objects and features of the present invention will become more fully apparent from the following description and appended claims, or may be learned by the practice of the invention as set forth hereinafter.

BRIEF DESCRIPTION OF THE DRAWINGS

In order that the matter in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention utilizes a different paradigm for facilitating the modeling of a chamber undergoing estimation. In the present invention, chambers or rooms undergoing graphical estimation are initially defined as a three-dimensional structure comprised of multiple facets or planes defining the boundaries of the volume. Such a volume bounded by a series of planes is commonly known as a polyhedron. In the present invention, the graphical interface of the estimation program provides a default polyhedron as a starting point for the modeling and estimation process.

Figure 1:
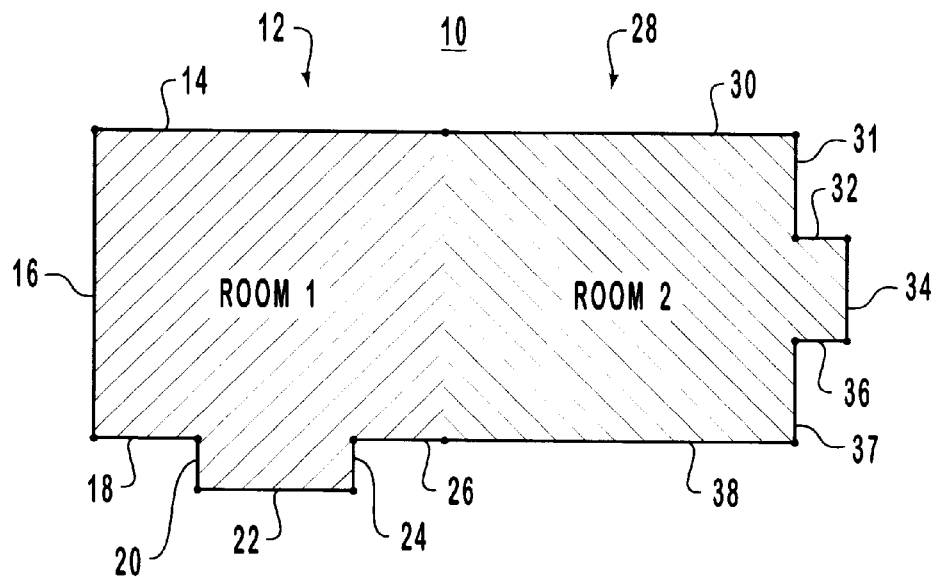
FIG. 1 depicts a prior art line-centric approach for modeling a room or chamber to be estimated.
Figure 2:
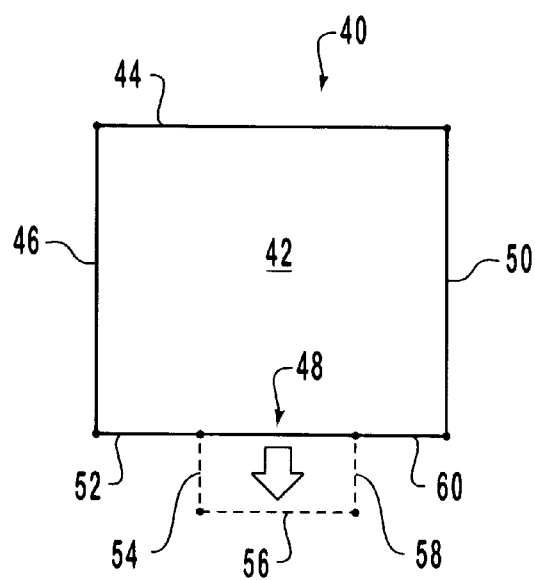
FIG. 2 depicts an estimation polyhedron undergoing a morphing process to approximate the chamber or room undergoing estimation, in accordance with a preferred embodiment of the present invention.

FIG. 2 depicts a default polyhedron 40 for use as a graphical estimation structure, in accordance with a preferred embodiment of the present invention. Default polyhedron 40 becomes an estimation polyhedron as its facets or planes are altered in various dimensions to become an acceptable approximation for modeling of the actual chamber or room undergoing the estimation process. As graphical images are displayed in only two dimensions, FIG. 2 depicts estimation polyhedron 40 from a top view with a surface plane 42 being the plane in view to the estimator. In FIG. 2, surface plane 42 may receive or have assigned thereto additional attributes specifying additional qualities of surface plane 42 such as defining surface plane 42 to be representative of the floor plane of the room undergoing estimation.

Surface plane 42, like all other planes forming estimation polyhedron 40, may be represented in various manners characteristic of polygon representation such as an enumeration of vertices defining surface plane 42 or other polygon representations known by those of skill in the art. In order to enclose the polyhedron, planes in addition to surface plane 42 are required. FIG. 2 depicts planes 44, 46, 48 and 50 as adjacent planes to surface plane 42 for forming an encompassing perimeter about surface plane 42. Planes 44, 46, 48 and 50 may be further individually comprised of additional attributes specifying a particular relationship of such planes with surface plane 42. For example, planes 44, 46, 48 and 50 may be defined with the attributes specifying them as walls adjacent to and about the floor plane as defined by surface plane 42. It should be further pointed out that while not explicitly shown in FIG. 2, but better depicted in FIG. 3, a top plane which may also have the attribute of a ceiling is also provided to complete the enclosure and therefore the definition of estimation polyhedron 40.

As the present invention provides a graphical interface for an estimator to approximate or model a chamber or room undergoing estimation, estimation polyhedron 40 must be capable of being massaged and contorted to form an acceptable approximation of the chamber or room undergoing estimation. Such a graphical mutation or modification has commonly become known as morphing.

In the present example of FIG. 2, the room undergoing estimation exhibits an offset which the estimator desires to include within the estimation process. FIG. 2 depicts wall plane 48 as inadequately approximating the room or chamber undergoing estimation thereby requiring wall plane 48 to be further partitioned into additional planes or facets more closely approximating the room undergoing estimation.

As depicted in FIG. 2, the estimation program enables the estimator to partition wall plane 48 into a series of additional planes as depicted by planes 52, 54, 56, 58 and 60. Such planes replace the original plane 48 and although they form a more complex polyhedron having additional planes, planes 52–60 form a more acceptable approximation of the room undergoing estimation. In the graphical program of the present invention, the estimator may morph estimation polyhedron 40 by selecting wall plane 48 and graphically stretching or morphing an offset comprised of the aforementioned planes in the direction as depicted in FIG. 2.

As previously mentioned, the graphical model of the room undergoing estimation is maintained in a three-dimensional polyhedron. Therefore, when wall plane 48 is partitioned into additional morphed facets or planes, such a morphing also introduces changes in the definition of surface plane 42. To maintain the integrity of the three-dimensional polyhedron definition of the model of the room undergoing estimation, the morphed planes or facets must be included within the definition of estimation polyhedron 40.

The definition of exiting adjacent planes must also be revised and recalculated to include the additional attributes such as the revised surface area resulting from the insertion of an offset into the estimation polyhedron. It should also be appreciated that in addition to altering surface plane 42, such a morphing process also affects the ceiling plane in a likewise manner. An estimator using the graphical method of the present invention may continue to morph or mold the estimation polyhedron until such a graphical model adequately approximates the room or chamber undergoing estimation.

Figure 3:
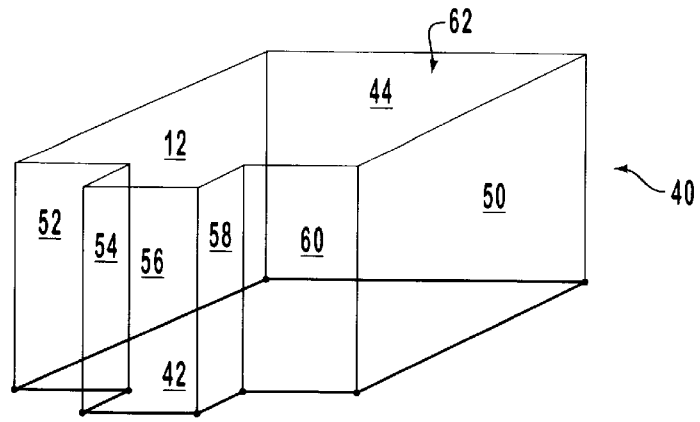
FIG. 3 depicts a three-dimensional view of an estimation polyhedron employed to model the chamber or room undergoing estimation, in accordance with the graphical method for modeling and estimating of the present invention.

FIG. 3 depicts a three-dimensional view of estimation polyhedron 40 following the morphing process wherein an offset or other morphed feature has been inserted to better approximate the room undergoing estimation. In FIG. 3, it should be appreciated that each of the planes comprising estimation polyhedron 40 take on a planar surface profile definable by individual polygons. While the present example depicts the polygons as having orthogonal relationships, nothing in the present invention prevents wall planes from having a taper or slope associated therewith when considered in relation to floor plane 42. Furthermore, nothing prevents ceiling plane 62 from exhibiting a vaulted profile in relation to floor plane 42.

It should also be pointed out that while the definition of estimation polyhedron 40 includes a specific recitation of surface plane or floor plane 42, wall planes 44–60 and ceiling plane 62, estimation polyhedron 40 may also be minimally defined by wall planes 44–60 with surface plane 42 and ceiling plane 62 being implied from the definitions of wall planes 44–60 and are necessary for completing or enclosing the volume of estimation polyhedron 40. Furthermore, it should be further pointed out that while surface or floor plane 42 is depicted as a single plane, surface areas may also include multiple definitions of floor planes such as in the case of a sunken area in more elaborate room structures. Likewise, ceiling plane 62 may be partitioned into multiple ceiling planes to further define more elaborate ceiling structures such as vaulted or sloped-ceiling configurations.

Figure 4:
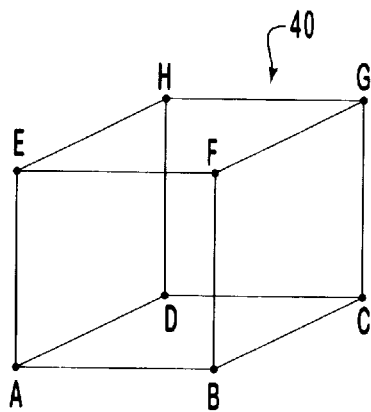
FIG. 4 depicts an exemplary polyhedron definition, in accordance with a preferred embodiment of the present invention.

FIG. 4 depicts a simplified definition of a polyhedron defining a first room, in accordance with an embodiment of the present invention. As described above, an estimation polyhedron is comprised of a plurality of polygons forming an enclosed volume consistent with the modeling structure of the present invention. In the present example, each polygon is defined as a series of vertices with a minimum number of three vertices necessary for defining a plane or polygon. Vertices may be defined as a series of three-dimensional or Cartesian coordinates in the X, Y and Z planes, as in the case of the preferred embodiment, or may assume other dimensioning techniques known by those of skill in the art including the use of other coordinate definitions or polygon representations.

As described above, polygons also may be assigned specific attributes or other information calculated in real time or post-calculated. Such attributes or information may include specifying a particular polygon to assume the characteristics of a surface polygon thereby implying the designated polygon be displayed graphically to the estimator, functional/locational attributes such as floor, wall and ceiling definitions. Additional attributes or qualities assigned to the polygons may further include thicknesses of walls and other display and calculation attributes such as specifying a particular polygon or wall as being a missing wall for purposes of calculation and display. Yet further estimation attributes may be included which specify the surface area associated with a particular polygon and corresponding dimensioning and the appropriate unit definition such as, for example, specifying the surface area of wall surfaces to be specified as square footage while floor surface areas may be specified in square yards.

While the present example of FIG. 4 specifies a room as being a series of grouped polygons, a plurality of rooms may be defined as a pool of polygons forming the planes associated with various rooms and linked together or specified as being shared or assigned to a specific room entity.

FIG. 4 further depicts a first room and its definition as being able to be encompassed with an additional hierarchical definitions. For example, in FIG. 4 the defined room may also form a portion of a level such as a first floor and be further included within a multi-level definition or structure such as a specific form or structure definition. Such hierarchical relationships are further discussed below in relation to FIG. 7.

Figure 5:
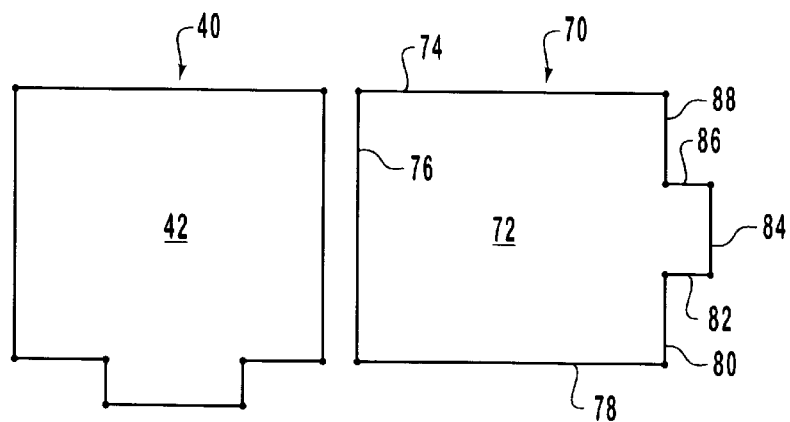
FIG. 5 depicts a two-dimensional view of a first estimation polyhedron and a second estimation polyhedron forming models for approximating a first room and a second room undergoing estimation, in accordance with a preferred embodiment of the present invention.

FIG. 5 depicts adjacent placement of a plurality of rooms, in accordance with the preferred embodiment of the graphical estimation program of the present invention. The present estimation program facilitates the combining of a plurality of estimation polyhedrons for the formation of a hierarchical or larger structure comprised of multiple models of rooms or chambers undergoing estimation. A first estimation polyhedron 40 is depicted and graphically presented with a view of surface plane 42 consistent with the description of FIG. 2. Additionally, a second estimation polyhedron 70 may be selected and placed adjacent to first estimation polyhedron 40 to comprise either adjacent rooms undergoing estimation or to accommodate the estimator in developing a larger chamber comprised of yet smaller chambers to improve the estimation process through such a graphical representation.

Second estimation polyhedron 70 is comprised of a plurality of planes thereby closing a volume to form a polyhedron. The planes or facets associated with second estimation polyhedron 70 form the polygons for defining second estimation polyhedron 70, with both plane 72 having the attribute of a surface plane, and adjacent wall planes being comprised of planes 74 through 88. While second estimation Polyhedron 70 is depicted as being distant from first estimation polyhedron 40, such a depiction is merely illustrative to highlight that estimation polyhedrons 40 and 70 are distinct modeled entities. Furthermore, when the grouping of planes to form a polyhedron is performed by linking polygons from a pool of polygons to form an estimation polyhedron, the common polygon may be singly defined and multiply linked to a plurality of polyhedron definitions.

Figure 6:
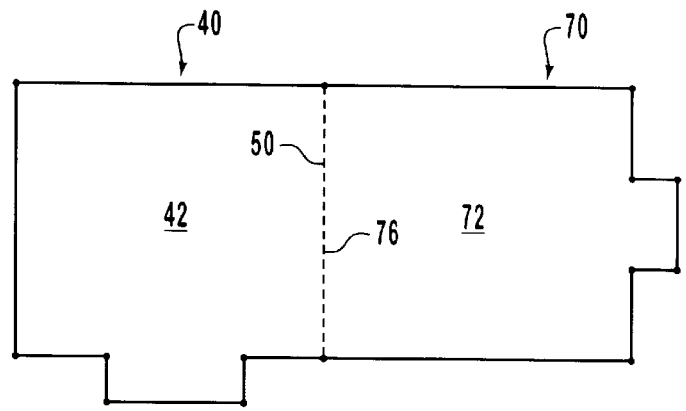
FIG. 6 depicts the merger of a first estimation polyhedron with a second estimation polyhedron having a common missing wall therebetween, in accordance with a preferred embodiment of the present invention.

FIG. 6 depicts the contiguous placement of first estimation polyhedron 40 and second estimation polyhedron 70. Furthermore, plane 50 of first estimation polyhedron 40 is depicted as being identical to the definition of plane 76 of second estimation polyhedron 70. While definitions of the individual rooms may include the redundant definition of the shared polygon, the preferred embodiment defines a polygon having the descriptive vertices of the shared polygon and links the shared polygon to the definition of both first estimation polyhedron 40 and second estimation polyhedron 70.

The graphical estimation program of the present invention further accommodates inclusion of attributes for particular planes consistent with physical structures and estimator preferences. For example, it is common in many structures for a room or chamber to have a missing or partially open wall that enters into a second room or chamber as depicted in FIG. 6. For accurate estimation purposes, it is necessary to designate or assign attributes to such planes or facets to preclude an overestimation of the required materials or labor in an estimate of the rooms of a structure. Additional attributes or characteristics may also be defined for planes of the estimation polyhedron. For example, a plane, and therefore a polygon, may be assigned the attribute forming a wall portion of the polyhedron and also be given a wall thickness attribute or wall composition attribute to facilitate both accurate dimensioning and estimation of the target chamber or room. Likewise, a plane may be given the attribute of a "missing wall" thereby precluding the inclusion of such a plane in the estimation calculations.

Figure 7:
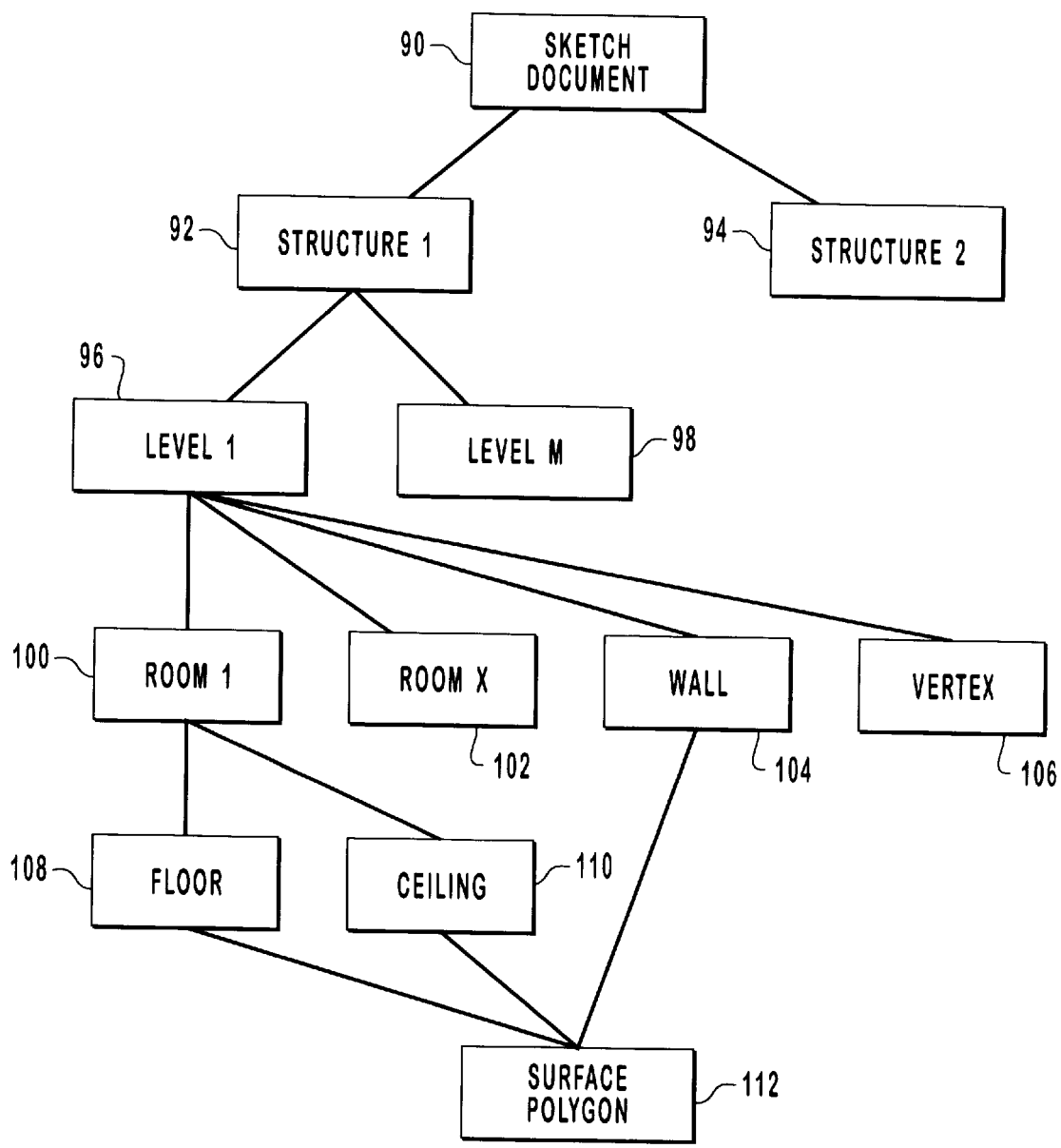
FIG. 7 depicts a data structure relationship diagram for hierarchically associating a plurality of polygons into various grouped relationships, in accordance with a preferred embodiment of the present invention.

FIG. 7 depicts a room data structure relationship diagram, in accordance with a preferred embodiment of the present invention. In the present figure, a sketch document 90 provides a "container" for the sublevel structures and other estimation-specific information. Structures 92 and 94 are each comprised of levels, levels 96 and 98 for stricture 92, which correspond to real-world structures such as buildings. Levels 96 and 98 may commonly be considered as "floor plans" such that a particular level corresponds with an individual floor of a structure. In the preferred embodiment of the graphical estimation program, each level has an elevation associated therewith and each level contains rooms, walls and vertices.

The estimation polyhedrons as heretofore described are hierarchically depicted as rooms 100 and 102. That is to say, a room is a three-dimensional polyhedron with boundaries defined by surface polygon 112 formed by floor polygon 108, ceiling polygon 110 and wall polygons 104. In the preferred embodiment of the present invention wherein the chamber or room undergoing estimation takes the form of a traditional structural configuration, wall 104 forms a vertical boundary for a room. In the preferred embodiment, wall 104 is represented by a center line and a thickness that are then used to calculate the actual surface polygons and intersection points. Wall 104 is defined as having two surfaces that may either face into a room and an exterior or the two surfaces may face into two rooms.

A vertex 106, in the preferred embodiment, is placed at each point where wall planes intersect. Each vertex is defined by being touched or intersected by at least two walls. As briefly described above, surface polygon 112 forms the visible or graphically-presented parts of the wall planes, ceiling planes and floor planes. Surface polygon 112 is calculated by the intersection of adjacent planes. Likewise, floor plane 108 is the surface polygon of the floor defined by the walls of a room. Additionally, ceiling 110, in the preferred embodiment, is also defined by the walls of the room. It should be pointed out that while the present figure depicts the chamber undergoing estimation as being a conventional inhabitable structure such as a building, nothing prevents the definition or attributes assigned to the polyhedron from taking other forms allowing less conventional "rooms" or chambers from being estimated. For example, structures that do not have conventional "floor", "ceiling" and "walls" nomenclature, may also be estimated using the graphical estimation method and program of the present invention.

Figure 8A:
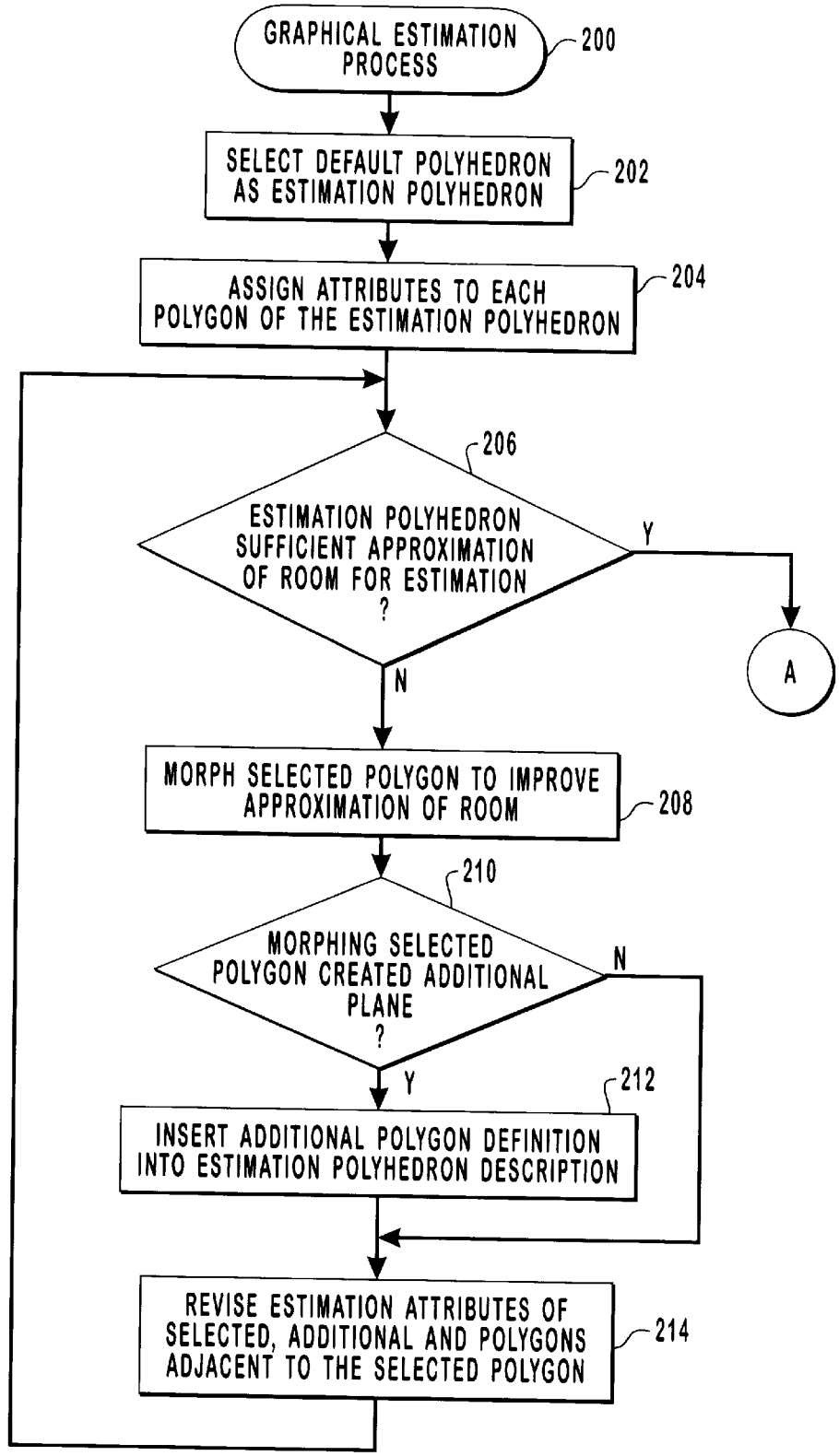
FIGS. 8A and 8B are flowcharts of a graphical estimation process, in accordance with the preferred embodiment of the present invention.
Figure 8B:
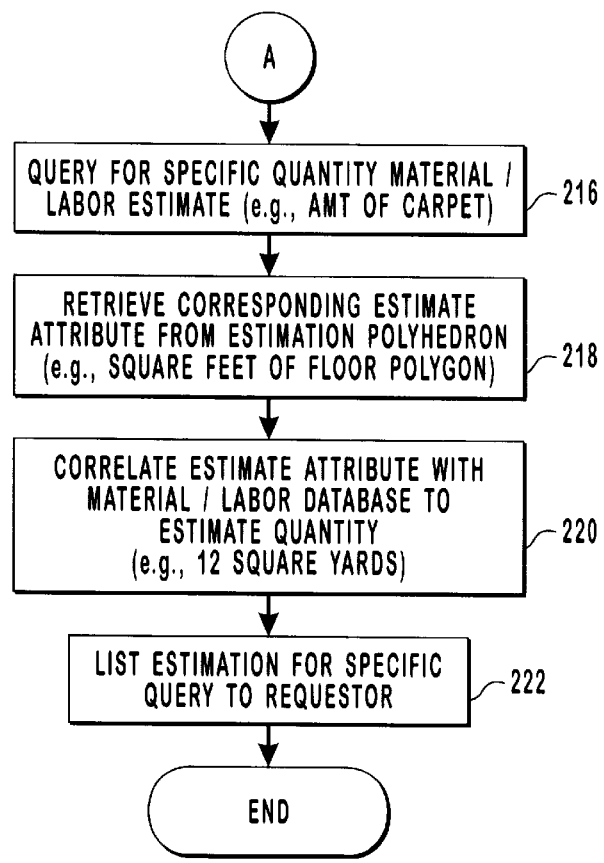

FIG. 8 depicts a method for modeling and graphically estimating attributes of a room, in accordance with the preferred embodiment of the present invention. A graphical estimation process 200 models a room or chamber undergoing estimation by facilitating the morphing of a polyhedron to adequately approximate the room undergoing estimation and thereafter generates an estimation from the modeled room in response to a query for specific estimate information.

A step 202 enables a user to select a default polyhedron for use as an estimation polyhedron during the estimation process. Such a selection may include a first room opening into a second room. Additionally, graphical estimating programs heretofore have incorporated line-centric approaches of concatenating a series of line segments eventually closing to form a closed two-dimensional body forming a single perspective from which an estimation may be made. In the present invention, selection of the default polyhedron may be performed by an estimator using a tool kit or other graphical interface allowing the selection and physical placement of a default polyhedron. Such a selection and placement process may further allow an estimator to roughly size the default polyhedron by stretching or dragging displayed parameters of the surface polygon of the polyhedron.

It should be further stressed that the selected default polyhedron provides a volumetric model for use in the modeling and estimation process. The selection of a default polyhedron may also be customized through the use of predefined preferences designating standard dimensions consistent with the scale frequently used by the estimator. For example, an estimator may utilize the present invention in providing estimation of residential structures. In such an example, a traditional selected default polyhedron may be defined as having dimensions consistent with a typical bedroom having a room size of roughly 12 feet by 12 feet and a ceiling height of 8 feet.

A step 204 assigns attributes to each polygon of the estimation polyhedron which may occur simultaneous with the selection of the default polyhedron in step 202. For example, an estimator frequently utilizing the present invention to estimate residential structures, may default the surface polygon to assume the attribute of a floor and may further default adjacent polygons to assume attributes of walls having thicknesses representative of 2 by 4 construction. In another example, step 204 allows the estimator to select specific polygons or planes and assign thereto attributes such as interior wall, exterior wall, or other related structural attributes.

A query task 206 determines whether the estimation polyhedron sufficiently approximates the room undergoing estimation. When the estimation polyhedron has not been sufficiently morphed to adequately approximate the chamber or room undergoing estimation, a task 208 enables an estimator to graphically stretch and contort (i.e., morph) the estimation polygon in various dimensions to better approximate the room undergoing estimation.

A query task 210 determines if such morphing results in the inclusion of additional polygons within the definition of the polyhedron as opposed to mere changes in dimensioning of existing polygons. When such morphing rises to the level of introducing additional polygons or planes into the polyhedron definition, a step 212 inserts or alternatively partitions a selected facet or polygon definition into the estimation polyhedron definition. Such morphing is graphically depicted and responsive to the selection of the estimator.

A step 214 revises the estimation attributes of any selected and modified or additional polygons as well as adjacent polygons to the morphed or selected polygon as well as and other polygons affected by the morphing process. That is to say, vertices and other descriptors of the modified polygon are updated and stored including attributes such as the surface area associated with affected polygons which are also updated consistent with the new dimensions resulting from the morphing process. Processing then returns to query task 206 for a determination as to the adequacy of the morphed polyhedron and whether it is an adequate approximation of the room undergoing estimation. The estimator iteratively continues to morph and modify the estimation polyhedron until such time as the polyhedron adequately models or approximates the room undergoing estimation.

Processing then passes to a step 216 wherein an estimator may query the model to obtain specific quantity information such as required material and labor estimates. Exemplary queries may include an estimation of the square footage of selected walls, estimated square yardage of required carpet for polygons having floor attributes, drywall material and labor estimates for wall and ceiling, painting and cleaning estimates, as well as other room specific information such as the total volume of the room undergoing estimation.

In a step 218, the estimation program of the present invention retrieves the corresponding estimation attribute from the estimation polyhedron model. Such estimations are then correlated in a step 220 to compute from the attribute retrieved from the estimation polyhedron model with the specific quantity of material or labor as requested by the estimator. A step 222 lists the estimation responsive to the query of step 216 to the estimator for evaluation.

Figure 9:
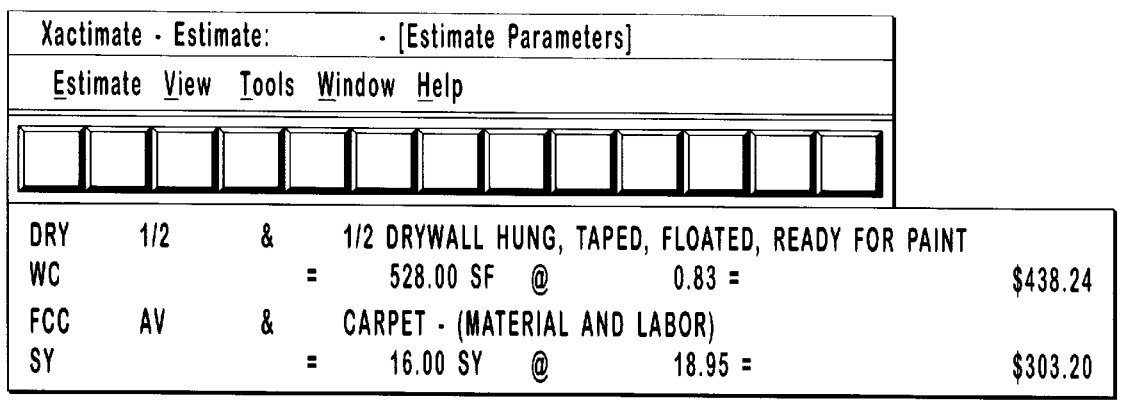
FIG. 9 depicts a query to the graphical model of the chamber or room undergoing estimation for retrieving specific estimation requirements from attributes associated with the model, in accordance with the preferred embodiment of the present invention.

FIG. 9 depicts an exemplary listing responsive to a query for estimated parameters, in accordance with the preferred embodiment of the present invention. In FIG. 9, a listing responsive to a query for the amount of drywall material and labor required for both the walls and ceilings is depicted. Such a query lists the type of material, half-inch drywall, and further specifies what the estimation includes. For example, the estimation for half-inch drywall includes hanging, taping, floating, and preparing the drywall for taping for 528 square feet as requested for both walls and ceilings at a price of $0.83 per square foot, totalling $438.24. Likewise, a query for the amount of carpet required for the plane or polygon having the attribute of the floor, results in a listing of required material and labor specifying the surface area of the floor area and is responsive to a selection by the estimator of a carpet grade and price.

The present invention may be embodied in other specific forms without departing from its spirit or essential characteristics. The described embodiments are to be considered in all respect only as illustrative and not restrictive. The scope of the invention is, therefore, indicated by the appended claims rather than by the foregoing description. All changes which come within the meaning and range of equivalency )f the claims are to be embraced within their scope.

What is claimed and desired to be secured by United States Letters Patent is:

1. A method for computerized modeling of a chamber to enable automatic computerized estimation of chamber attributes, comprising the steps of:
   (a) selecting a default polyhedron as a cost estimation polyhedron, said estimation polyhedron having a plurality of facets with each facet having at least one characteristic and comprised of at least one estimation attribute including an area;
   (b) altering at least one of said characteristics of a selected facet of said plurality of facets of said estimation polyhedron to approximate said chamber undergoing estimation;
   (c) revising in real time said at least one estimation attribute of said altered facet and adjacent ones of said plurality of facets of said estimation polyhedron as modified by said altering step; and
   (d) repeating said altering and revising steps until said estimation polyhedron accurately depicts said chamber undergoing estimation.

2. The method as recited in claim 1, wherein:
   (a) said altering step further comprises the step of when additional facets better approximate said chamber undergoing approximation, partitioning said selected facet of said estimation polyhedron into at least a first and second altered facets to provide an improved estimation of said chamber undergoing estimation; and
   (b) said revising step further comprises the step of from said at least first and second altered facets of said selected facet, including additional estimation attributes corresponding to said first and second altered facets.

3. The method as recited in claim 1, further comprising the step of:
   (a) defining said chamber as a room within a building; and
   (b) defining said chamber attributes to include a surface area correlating to said plurality of facets of said estimation polyhedron.

4. The method as recited in claim 3, wherein said defining said chamber attribute step further comprises the steps of:
   (a) assigning one of said plurality of facets of said estimation polyhedron a floor attribute of said room;
   (b) assigning each of others of said plurality of facets of said estimation polyhedron adjacent to said facet having said floor attribute a wall attribute; and
   (c) assigning one of said plurality of facets of said estimation polyhedron adjacent to said ones of said plurality of facets having said wall attribute a ceiling attribute.

5. The method as recited in claim 1, wherein said selecting a default polyhedron further comprises the step of:
   (a) defining said default polyhedron to include:
      i. at least 4 facets each defined by a plurality of vertices shared by others of said at least 4 facets;
      ii. a surface area for each of said at least 4 facets; and
      iii. a volume of said default polyhedron as bounded by each of said at least 4 facets.

6. A method for graphically estimating attributes of a room, comprising the steps of:
   (a) selecting a default polyhedron as a cost estimation polyhedron to approximate said attributes of said room, said estimation polyhedron having a plurality of facets, each facet having at least one characteristic and comprised of at least one estimation attribute including an area;
   (b) altering at least one characteristic of one of said plurality of facets of said estimation polyhedron to approximate said room undergoing estimation;
   (c) revising in real time said at least one estimation attribute of said altered facet and adjacent facets of said estimation polyhedron;
   (d) repeating said altering and revising steps until said estimation polyhedron accurately depicts said room undergoing estimation; and
   a. listing said estimation attributes of said estimation polyhedron as said attributes of said room.

7. The method as recited in claim 6, wherein said selecting step further comprises the steps of:
   (a) assigning one of said plurality of facets of said estimation polyhedron a floor attribute of said room;
   (b) assigning each of others of said plurality of facets of said estimation polyhedron adjacent to said facet having said floor attribute a wall attribute; and
   (c) assigning one of said plurality of facets of said estimation polyhedron adjacent to said ones of said plurality of facets having said wall attribute a ceiling attribute.

8. The method as recited in claim 6, wherein:
(a) said altering step further comprises the step of when additional facets better approximate said chamber undergoing approximation, partitioning said selected facet of said estimation polyhedron into at least a first and second altered facets to provide an improved estimation of said chamber undergoing estimation; and
(b) said revising step further comprises the step of from said at least first and second altered facets of said selected facet, including additional estimation attributes corresponding to said first and second morphed facets.

9. The method as recited in claim 6, further comprising the steps of hierarchically grouping additional rooms into levels and grouping a plurality of levels into a structure.

10. A graphical method for estimating material requirements for a room within a structure, wherein said room is comprised of a plurality of planes, comprising:
(a) displaying a default surface polygon, said surface polygon forming one plane of a plurality of planes of an estimation polyhedron for approximating said room, said plurality of planes each further having a characteristic and an estimation attribute assigned thereto;
(b) altering said characteristic of said default surface polygon into an altered polygon to approximate a plane of said room undergoing estimation;
(c) revising said estimation attribute of said altered polygon and adjacent ones of said plurality of planes affected by said altering step;
(d) repeating said altering and revising steps until said estimation polyhedron accurately approximates said room undergoing estimation; and
(e) converting said estimation attributes of said estimation polyhedron into said material requirements for said room within said structure.

11. The method as recited in claim 10, wherein:
(a) said altering step further comprising the step of when additional planes better approximate said room undergoing estimation, partitioning said altered polygon of said estimation polyhedron into at least a first and second altered polygons to provide an improved estimation of said room undergoing estimation; and
(b) said revising step further comprises the step of from said at least first and second altered polygons of said selected facet, including additional estimation attributes corresponding to said first and second altered polygons.

12. The method as recited in claim 11, wherein said converting said estimation attributes of said estimation polyhedron step comprises the step of:
(a) converting said estimation attribute into a quantity of a specific one of said material requirements.

13. The method as recited in claim 11, further comprising the steps of:
(a) redefining another one of said plurality of planes of said estimation polyhedron as said default surface polygon to display said polygon, alter characteristics and revise estimation attributes associated therewith.

14. The method as recited in claim 10, wherein said displaying step further comprises the steps of:

(a) assigning one of said plurality of planes of said estimation polyhedron a floor attribute of said room;
(b) assigning each of others of said plurality of planes of said estimation polyhedron adjacent to said plane having said floor attribute a wall attribute; and
(c) assigning one of said plurality of planes of said estimation polyhedron adjacent to said ones of said plurality of planes having said wall attribute a ceiling attribute.

15. A computer-readable medium having computer-executable instructions for performing the steps comprising:
(a) displaying a default surface polygon, said surface polygon forming one plane of a plurality of planes of an estimation polyhedron for approximating said room, said plurality of planes each further having an estimation attribute assigned thereto;
(b) altering said default surface polygon into an altered polygon to approximate a plane of said room undergoing estimation;
(c) revising said estimation attribute of said altered polygon and adjacent ones of said plurality of planes affected by said altering step;
(d) repeating said altering and revising steps until said estimation polyhedron accurately approximates said room undergoing estimation; and
(e) converting said estimation attributes of said estimation polyhedron into said material requirements for said room within said structure.

16. The computer-readable medium of claim 15 having further computer-executable instructions for performing the steps of:
(a) said altering step further comprises the step of when additional planes better approximate said room undergoing estimation, partitioning said altered polygon of said estimation polyhedron into at least a first and second altered polygons to provide an improved estimation of said room undergoing estimation; and
(b) said revising step further comprises the step of from said at least first and second altered polygons of said selected facet, including additional estimation attributes corresponding to said first and second altered polygons.

17. The computer-readable medium of claim 15, wherein said computer-executable instructions for performing the step of converting said estimation attributes of said estimation polyhedron step further comprises computer-executable instructions for performing the step of:
(a) converting said estimation attribute into a quantity of a specific one of said material requirements.

18. The computer-readable medium of claim 15, having a further compeer-executable instructions for performing the steps of:
(a) redefining another one of said plurality of planes of said estimation polyhedron as said default surface polygon to display, alter and revise estimation attributes associated therewith.

19. The computer-readable medium of claim 15, wherein said computer-executable instructions for performing the step of displaying a default surface polygon further comprises computer-executable instructions for performing the step of:

(a) assigning one of said plurality of planes of said estimation polyhedron a floor attribute of said room;

(b) assigning each of others of said plurality of planes of said estimation polyhedron adjacent to said plane having said floor attribute a wall attribute; and (c) assigning one of said plurality of planes of said estimation polyhedron adjacent to said ones of said plurality of planes having said wall attribute a ceiling attribute.

20. The computer-readable medium of claim 15, having further computer-executable instructions for performing the step of hierarchically grouping additional rooms into levels and grouping a plurality of levels into a structure.

* * * * *